F. TEEPELL.
Millstone-Exhaust.
No. 200,949. Patented March 5, 1878.
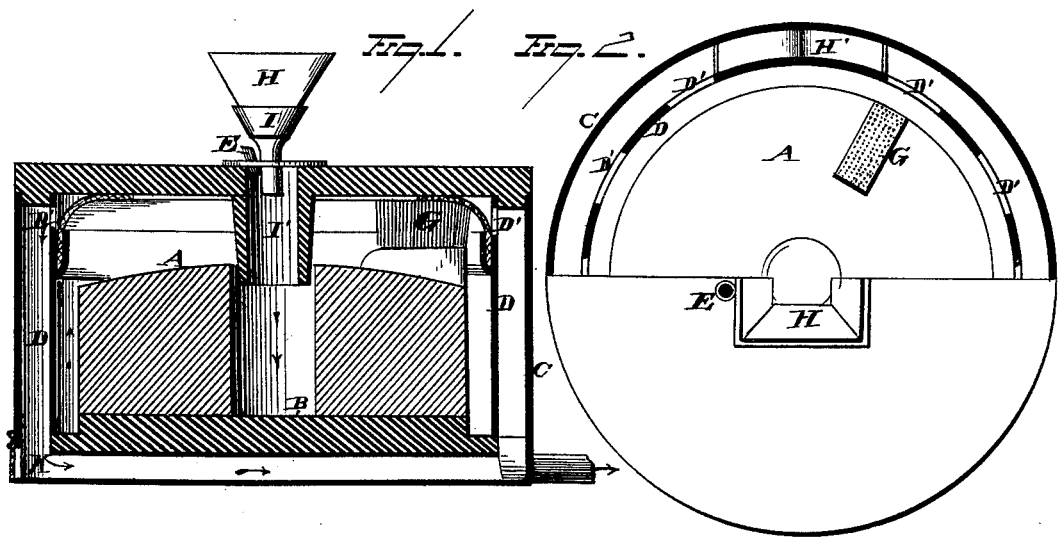
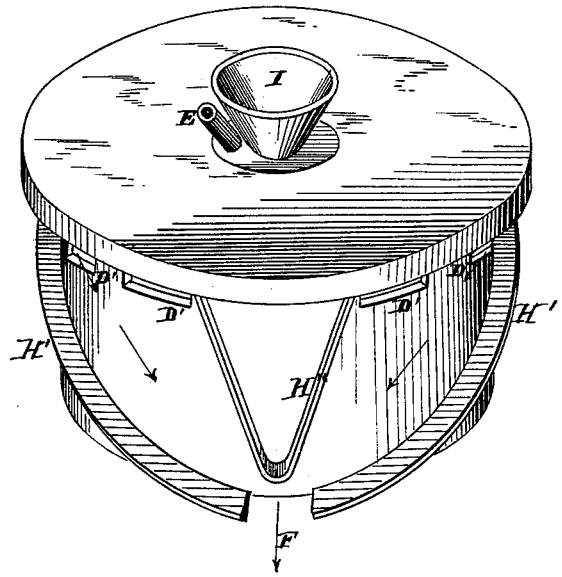
WITNESSES
Ed. S. Nottingham
A. W. Bright
INVENTOR
F. Teepell
By Leggett & Leggett
ATTORNEYS

UNITED STATES PATENT OFFICE.

FRANCIS TEEPELL, OF AKRON, OHIO.

IMPROVEMENT IN MILLSTONE-EXHAUSTS.

Specification forming part of Letters Patent No. 200,949, dated March 5, 1878; application filed January 21, 1878.

*To all whom it may concern:*

Be it known that I, FRANCIS TEEPELL, of Akron, in the county of Summit and State of Ohio, have invented certain new and useful Improvements in Millstone-Ventilators, &c.; and I do hereby declare the following to be a full, clear, and exact description of the invention, such as will enable others skilled in the art to which it pertains to make and use it, reference being had to the accompanying drawings, which form part of this specification.

My invention relates to improvements in the ventilation of millstones used in flouring-mills, whereby a more perfect ventilation in and about the stones can be secured, and the product of the millstones more thoroughly confined, thereby greatly increasing the yield of the stones.

It consists of a double air-tight casing for the millstones, the inner casing having apertures at or near the top for the free passage of air. These air-passages are covered by a screen, to prevent the products of the millstones from escaping into the air-passages between the two casings, and from thence to the exhaust-pipe.

It also consists of a suitable brush or broom permanently or removably attached to the upper surface of the upper millstone, which, at each revolution of the stone, thoroughly cleans the cloth or screen covering the air-passages in the upper part of the inner casing, thereby keeping the air-passages free for the passage of air, but closed for the products of the millstones.

It also consists of a screen through which the air entering by the air-tube is obliged to pass before escaping through the exhaust-pipe. The office of this screen is to intercept all particles of the products of the millstones.

In the drawings, Figs. 1 and 3, A and B represent, respectively, the upper and nether millstones. C represents the outer casing, and D the inner casing. D' represents the apertures in the inner casing to admit the free passage of air from the stones to the chamber formed by the two casings C and D. The apertures are effectually closed against the passage of the products of the millstones by a screen made of any suitable material, but sufficiently porous for the free passage of air.

Air is prevented from entering the casings through the flour-passage K by a piece of cloth or other suitable material suspended from the upper side of the flour-passage, allowing the free passage of flour, but closing the passage to the entrance of air. A contrivance similar to a breast water-wheel might be used, which would perform the same functions.

E represents the air-tube, connected with any suitable air-pump or blower. F represents the exhaust-pipe, also connected with a blower or other suitable exhausting apparatus. G represents a brush or broom permanently attached to the upper surface of the upper millstone, which, at each revolution of the stone, effectually cleans the screen covering the apertures in the inner case, allowing the free passage of air. H represents an ordinary hopper. I represents a funnel, through which the grain passes from the hopper to the eye of the stone. I' represents a second funnel, secured to the cover of the casings and extending down into the eye of the stone, with which both the grain-funnel and the air-tube E connect. The object of this second funnel I' is to give direction to the current of air entering at the air-tube E to the faces of the millstones, and also to prevent the escape of the air from the casings.

Fig. 3 represents the inner casing of the millstones with the outer casing removed. Between the two casings is a guide, H', extending from the top of the casings opposite the exhaust-pipe around the inner casing D, and between that and the outer casing C to the exhaust-pipe. There is also another guide-plate, H'', in Fig. 3, placed between the two casings, of a triangular shape, having for its base the covering of the cases between apertures D' in the inner casing, with its sides extending toward the exhaust-pipe, the angle formed by its sides being near the exhaust-pipe F.

In the above-described arrangement it will be seen that a more perfect ventilation is secured than heretofore, a more powerful exhaust can be applied, while the escape of flour is effectually stopped, thereby adding materially to the yield of the millstones.

Having thus described my invention, what I claim as new, and desire to secure by Letters Patent, is—

1. The combination, with an upper millstone having a brush or broom secured to its upper surface, of an inner and outer casing, together constituting an intervening annular air-chamber, said inner chamber provided with air-passages and suitable screens for covering said air-passage, substantially as set forth.

2. The combination, with casings D and C, of the air-guides E H' and central guide H'', said guides converging at the exhaust-passage F, substantially as set forth.

In testimony whereof I have signed my name to this specification in the presence of two subscribing witnesses.

FRANCIS TEEPELL.

Witnesses:
NEWTON CHALKER,
CHAS. RINEHART.